July 17, 1962 M. LOSHER 3,045,180
LOW FREQUENCY COMPLEX WAVE ANALYZER
Filed Feb. 9, 1959 4 Sheets-Sheet 4

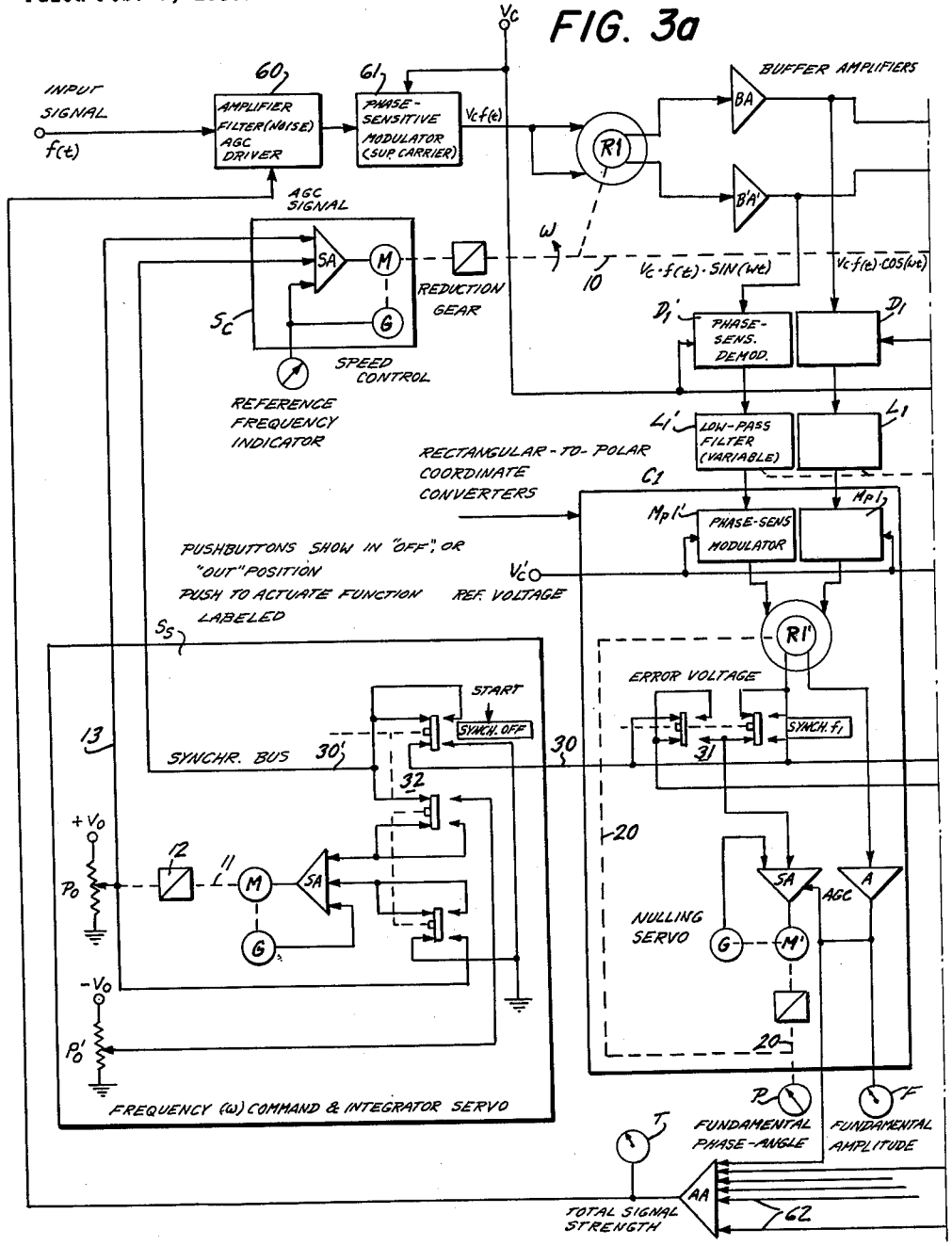

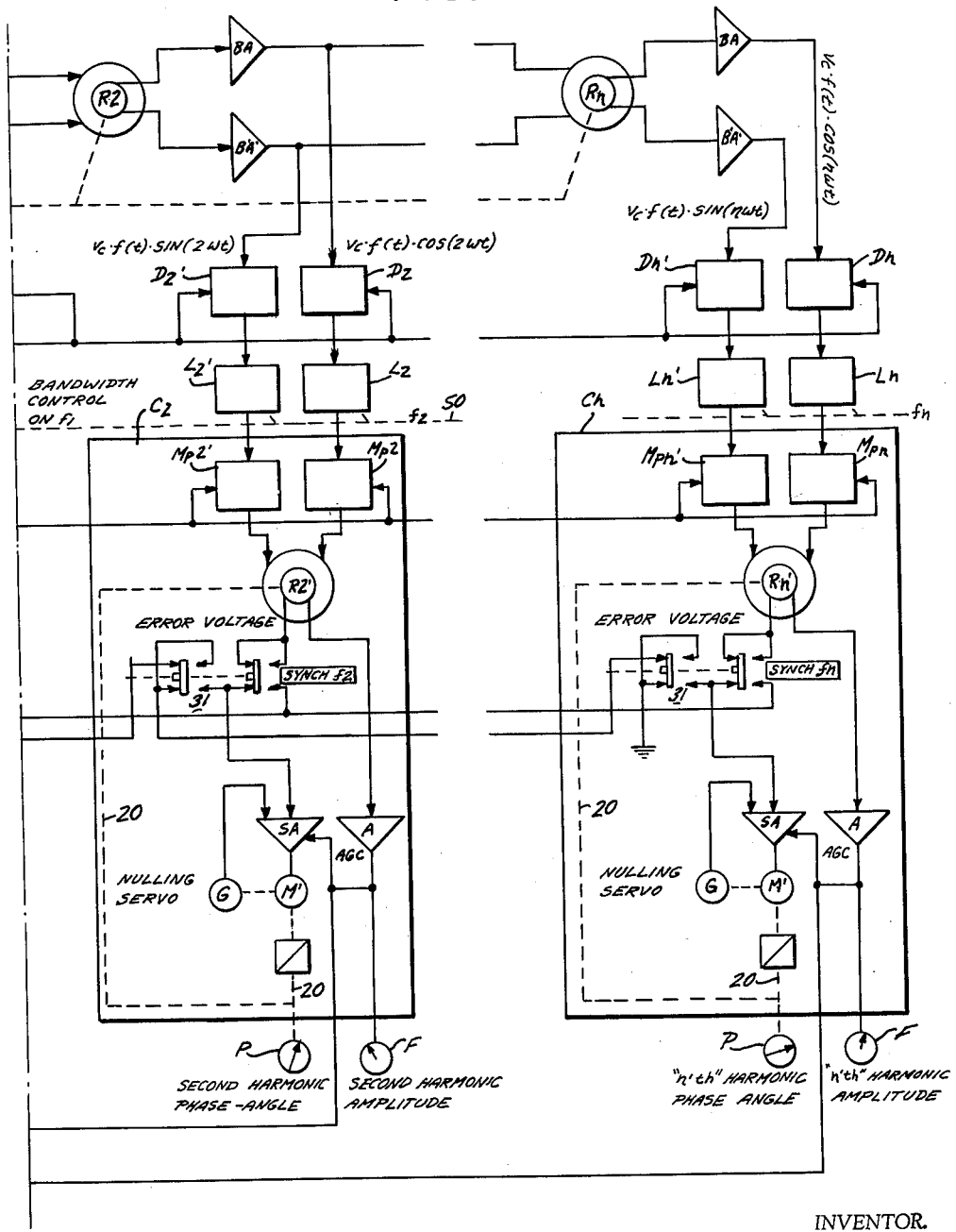

INVENTOR.
Thorton Losher
BY
Michael S. Striker
R. Harvey

United States Patent Office 3,045,180
Patented July 17, 1962

3,045,180
LOW FREQUENCY COMPLEX WAVE ANALYZER
Morton Losher, 700 Fort Washington Ave.,
Bergenfield, N.J.
Filed Feb. 9, 1959, Ser. No. 791,991
12 Claims. (Cl. 324—77)

The present invention refers to analyzing low-frequency repetitive complex wave signals and more particularly to analyzing a complex wave signal of unknown characteristics in order to determine whether such signal contains a fundamental frequency and harmonics thereof.

It is therefore a main object of this invention to provide for a method for analyzing low-frequency repetitive complex wave signals in such a manner that its possible content of a harmonic series of frequencies is determined and also the relative magnitude of individual harmonics thereof.

It is another object of this invention to provide for an apparatus adapted to carry out the method set forth with accuracy and efficiency.

With above objects in mind, a method for analyzing low-frequency repetitive complex wave signals according to the invention, applied to wave signals of the form $f(t)$, mainly comprises the steps of generating a number of reference frequencies constituting a harmonic series $\omega, \ldots \omega n$ and impressing these reference frequencies individually on a constant carrier frequency $V_c$ for modulating the latter; resolving each of the resulting modulated forms of said carrier frequency into the respective sine and cosine terms of the particular reference frequency; simultaneously multiplying individually said sine and cosine terms by said complex wave signal for obtaining a corresponding number of pairs of correlation signals of the form $V_c f(t)$ sin $(n\omega t)$ and $V_c f(t)$ cos $(n\omega t)$, respectively, wherein $n$ is an integer varying between 1 and $n$; demodulating individually said correlation signals; low-pass filtering said individual demodulated correlation signals; and varying the fundamental frequency of said harmonic series of reference frequencies until zero beat condition between at least one repetitive frequency contained in said complex wave signal $f(t)$ and at least one of said pairs of correlation signals is established in which case every one of said reference frequencies contained in said harmonic series thereof which has been adjusted to said zero beat condition indicates the existence of an identical frequency in said complex wave signal $f(t)$.

In another aspect of this invention, an apparatus for analyzing low-frequency repetitive complex wave signals mainly comprises, in combination, first input means for a constant carrier frequency voltage $v_c$; second input means for a low-frequency complex wave signal $f(t)$; modulator means connected with said first and second input means for modulating said carrier frequency by said complex wave signal; a plurality of $n$ resolver means operatively connected in series with each other and with the output of said modulator means and being capable of resolving an input voltage into corresponding sine and cosine terms thereof; means for introducing into each of said resolver means a variable modulation frequency $m\omega$ as a reference frequency, $m$ being an integer varying between 1 for the first of said resolver means and $n$ for the last of said series of $n$ resolver means, so that said respective modulation frequencies constitute a harmonic series, the individual pair of output signals of said resolver means having the form $v_c f(t)$ sin $(m\omega t)$ and $v_c f(t)$ cos $(m\omega t)$; means for uniformly varying said harmonic modulation frequencies $m\omega$; demodulator means respectively connected to the outputs of each of said resolver means; low-pass filter means for individualy filtering said output signals of said resolver means after their demodulation; and output means respectively connected with said individual filter means associated with each respective one of said resolver means, and including indicator means for indicating a beat condition between said complex wave signal and any one of said reference modulation frequencies, whereby if during variation of said modulation frequencies zero beat condition is indicated by any one of said indicator means, the existence, in said complex wave signal, of a frequency identical with that modulation frequency $m\omega$ for which zero beat condition has been obtained, is established.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 3a and 3b are schematic diagrams illustrating an apparatus forming an embodiment of this invention.

The low frequency complex wave analyzer according to the invention essentially performs the task of determining the relative values of the Fourier coefficients $A_n$ and $B_n$ of a low frequency repetitive complex waveform. Presentation is made of $C_n(=\sqrt{A_n^2+B_n^2})$, the relative amplitude, and of $$\Phi_n\left(=\tan^{-1}\frac{A_n}{B_n}\right)$$

the relative phase of the harmonics.

Figure 1:
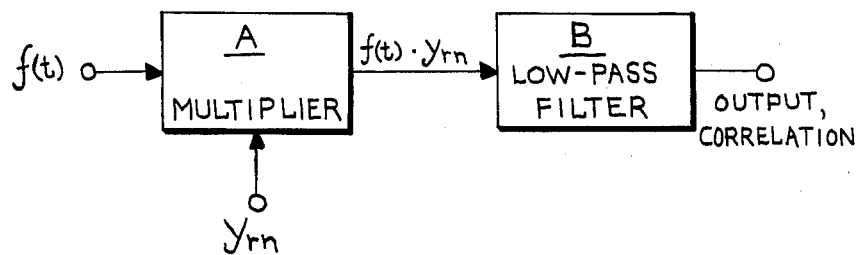
FIG. 1 is a schematic diagram illustrating a basic principle of the theory underlying this invention.

The basic principle of operation is as follows:

A function to be analyzed, $f(t)$, is multiplied simultaneously by a number of reference frequencies $y_r$, generated locally within the device. These terms are sine and cosine functions whose frequencies are $\omega_r$, $2\omega_r$, $3\omega_r$, $n\omega_r$, a harmonic series. Function $f(t)$ is multiplied by each one of these terms individually and each output is subsequently filtered by a low-pass filter. If a harmonic series or complex waveform is present in $f(t)$, very low frequency beats will occur at the outputs of each multiplier-filter combination when the reference $\omega_r$ approaches the fundamental frequency of the harmonic series in $f(t)$. This principle is illustrated in FIG. 1 on a single frequency basis as follows; let $f(t) = A_x \sin(\omega_x t + \Phi_x)$, and multiply it by a reference signal $y_{rn} = A_{rn} \sin(\omega_{rn} t + \Phi_{rn})$. The correlated output of the amplifier is $f(t) \cdot y_{rn} = A_x A_{rn} \sin(\omega_x t + \Phi_x) \sin(\omega_{rn} t + \Phi_{rn})$.

For the sake of simplicity, assume that $\Phi_x = 0$; and further, let us assume that $\omega_{rn}$ is close in value to $\omega_x$ so that $\omega_{rn} = \omega_x + \Delta\omega_{rx}$. The output of the multiplier consists of sine and cosine terms, respectively, in two groups of frequencies; one group has frequencies in the neighborhood of $2\omega_x$, the other group has frequencies of $\Delta\omega_{rx}$. If this composite group is applied to a low-pass filter whose cutoff frequency is well below $2\omega_x$, the output of the filter will be the low frequency beat $$\frac{A_x A_{rn}}{2}\{\cos \Phi_{rn} \cos \Delta\omega_{rx} t - \sin \Phi_{rn} \sin \Delta\omega_{rx} t\}$$

if $\Delta\omega_{rx}$ is below the filter cutoff frequency. In the limit, for $\Delta\omega_{rx} = 0$, the output becomes a true correlation between $f(t)$ and $y_{rn}$, and is equal to $$\frac{A_x A_{rn}}{2} \cos \Phi_{rn}$$

If $\Phi_{rn}$ is adjusted to equal zero the output is simply $$\frac{A_xA_m}{2}$$

Since $A_{rn}$ is the amplitude of the locally generated reference and known then, in effect, the amplitude of the "unknown" signal, $A_x$, has been measured. However, it is to be observed that this condition only obtains if $\Phi_x=0$. Since this process must also be applied simultaneously to the other harmonics where $\Phi_x$ may not be zero it is necessary to extend this technique one step further to properly measure all the harmonic amplitudes and phases. This is as follows, reference being had to FIG. 2.

Again, if $f(t)=A_x \sin (\omega_x t+\Phi_x)$, the measurement and presentation of $A_x$ and $\Phi_x$ involves two identical multiplier-filter channels, A, B, and A', B', as indicated, with the exception that in channel A the reference term is of the form $A_{rn} \sin (\omega_{rn}t+\Phi_{rn})$ and in channel B, $A_{rn} \cos (\omega_{rn}t+\Phi_{rn})$. Outputs $e_{oa}$ and $e_{ob}$ are of the form $$\frac{A_xA_m}{2} \cos \Phi' \text{ and } \frac{A_xA_m}{2} \sin \Phi'$$

respectively, where $\Phi'$ is the instantaneous phase difference between $f(t)$ and $y_{rn}$. The converter C produces two outputs; output one is the vector magnitude $$|e_{oa}+e_{ob}|=\frac{A_xA_m}{\sqrt{2}}$$

and output 2 is the vector angle, $\Phi'$. Thus it is seen that as $\Delta\omega_{rx}$ approaches zero, the output vector is rotating at a frequency $\Delta\omega_{rx}$ and small in magnitude, due to attenuation by the filters. As $\Delta\omega_{rx}$ goes thru zero, the vector slows down, builds up in magnitude to $$\frac{A_xA_m}{\sqrt{2}} \text{ (a measure of } A_x\text{)}$$

stops spinning entirely (showing phase between $f(t)$ and $y_{rn}$), then starts spinning in the opposite direction at $\Delta\omega_{rx}$ and decreasing in magnitude until $\Delta\omega_{rx}$ builds up beyond the filter cutoff frequency.

Figure 2:
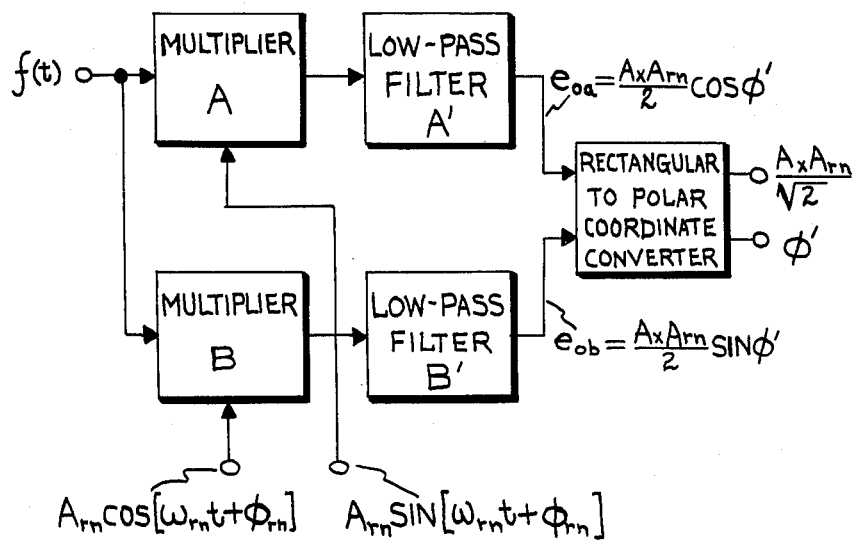
FIG. 2 is another schematic diagram illustrating further details of said theory.

FIG. 2 shows, in principle, the method of determining the phase and amplitude of a harmonic term in $f(t)$ as provided by this invention. The simultaneous measurement of $n$ harmonics ($n$ may approach 20) involves $n$ circuits, identical to that of FIG. 2, each driven by $f(t)$, except that the reference sine and cosine terms are at frequencies $n\omega$, corresponding to the harmonic series. It is necessary that the reference harmonic series of sine and cosine terms generated within the device be derived from one basic source so that a single parameter controls the basic $\omega$ generated. This is done in a manner to be explained below, describing the actual circuitry which performs this task.

In concluding this general discussion it is necessary to mention one important aspect of this principle of detection, that is the noise rejection capabilities of this type of correlation. It has been seen that when the reference frequency $\omega_{rn}$ is made equal to, or synchronized with, a harmonic series in $f(t)$, a non-varying or D.C. output results from the cross-correlation between terms in $f(t)$ synchronous with their corresponding reference signals. Since the basic principle involves filtering out the $2\omega_x$ terms as well as other non-harmonically related signal beats, noise as well is filtered. In fact, advantage may be taken of this fact in introducing additional filtering if noise energy is concentrated in and around the reference frequencies. Since noise can produce no long period correlation, in principle it is possible to detect synchronous signals in $f(t)$ even if deeply submerged in noise, by merely decreasing the filter band bandwidth. Of course, if the synchronous signal frequency is varying, there is a limit to the filtering possible beyond which the signal becomes attenuated. Hence, in practice, the amount of narrow banding after detection will depend upon the frequencies involved, the rate at which they change, and the noise present in the signal channel.

The actual device as illustrated by FIGS. 3a and 3b is as follows, which at the same time reveals further details of the method according to the invention.

Referring to the main functional diagram FIG. 2, the process of synchronous generation of the harmonic series of terms sin $\omega t$, cos $\omega t$, sin $2\omega t$, cos $2\omega t$, . . . sin $n\omega t$, cos $n\omega t$, from a single parameter and simultaneous multiplication of these terms by $f(t)$ is accomplished as shown in the upper part of the diagram FIG. 3a. A number of resolvers R1, R2 . . . R$n$ are mechanically coupled by a common drive shaft 10 so that their rotors turn at the same speed, $\omega$. Resolvers of this type are conventional as e.g. shown in Resolver Handbook, Reeves Instr. Co. Bulletin #57 (1954) p. 5, FIG. 3. It will be seen that each resolver, in effect, produces sine and cosine correlation in exact conformity to its place in the harmonic series if properly interconnected electrically, and that the speed, $\omega$, of shaft 10 represents the fundamental frequency in the series. Details of this part of the device are contained in my copending application Serial No. 792,009, of February 9, 1959, now abandoned.

If we let $f(t)=K$, then an unmodulated carrier $V_c$ is applied to the stators of the first resolver R1. The output of the first resolver R1 is then seen to be $V_cK$ sin $\omega t$ and $V_cK$ cos $\omega t$, from the two rotor windings of R1, if the rotor thereof is turned at a rate $\omega$ radians per second. If these two terms are applied to the second resolver R2, rotating at the same speed $\omega$, a flux vector is produced within it spinning at a rate $\omega$ in a direction opposite that of the rotor (assuming the correct polarity connection between rotor windings of R1 and stator windings of R2 is chosen which is a simple matter of experimentation). Hence the output of resolver R2, is $V_cK$ sin $2\omega t$ and $V_c$ cos $2\omega t$. If this process is continued indefinitely along the series of resolvers R1 . . . R$n$, it is seen that a harmonic series of terms in sin $n\omega t$, cos $n\omega t$ ($n$ varying between 2 and $n$) is built up. It is important to observe that all the resolvers turn at the same rate—that of the fundamental frequency $\omega$.

Since the resolvers in principle produce output voltages of the form $V_cK$ sin $n\omega t$ and $V_cK$ cos $n\omega t$, simultaneous multiplication of these terms with $f(t)$ is realized by modulating the carrier, $V_c$, by $f(t)$, producing $V_c \cdot f(t)$, and applying this waveform to the first resolver R1. Since the buffer amplifiers BA, B'A' interposed between consecutive resolvers maintain both unity gain between the stators of one resolver and those of the next, and maintain the phase of the carrier $V_c$, the outputs of each resolver are the product functions indicated in FIGS. 3a and 3b. These product terms are precisely the functions required to realize the method of coherent detection of the harmonic series that has been proposed. To obtain the correlation function it is merely necessary now to synchronously detect or demodulate these terms, since they are still in modulated form, and then filter, or narrow band the output. However, to present relative phase and amplitude, these modulated product terms containing the correlation terms, are respectively applied to associated converters C1, C2 . . . C$n$ comprising resolvers R1', R2', etc., as shown, and subsequent detection and filtering means.

From one of the two outputs per resolver R1', R2', etc., an error signal is branched off to drive a nulling servomotor M' coupled to the respective resolver R1', R2', etc., within the particular converter unit C1, C2, etc., these resolver-servoloop combinations being rectangular-to-polar coordinate converters. The angular position of the nulling resolver shaft 20 becomes indicative of the relative phase angle of that particular harmonic readable at P, and the other demodulated filtered output of the individual resolver R1', R2', etc., becomes indicative of the amplitude of the harmonic appearing in the respective output and readable at F.

Synchronization of the reference fundamental frequencies generated by the various coupled resolvers R1, R2 . . . Rn is accomplished by selecting a particular harmonic (derived from one of them) that is strong, as a control signal and transferring the error signal via synchronization bus 30 from the respective coordinate converter C1, etc., to the frequency command servo Ss shown in the lower left side of the diagram and to the speed control servo Sc. These two servos produce and control the fundamental frequency by controlling the speed, ω, of shaft 10 of the coupled resolvers R1, R2 . . . Rn.

The transfer arrangement for the error signals incorporates a two-pole push button switch 31 in each converter servoloop C1, C2, etc., and a three-pole push button switch 32 in the servo Sc, all said switches 31, 32 being ganged mechanically so that at any time only one of them can be in "ON" position. Thus at the start, when button 32 is pushed-in, the synchronization bus portion 30' is grounded while all converter servos C1, C2, etc., are operating normally. Any push button 31, when actuated, transfers the converter error signal from the associated resolver to the synchronization bus 30, 30' and de-activates that particular converter servo, while bus portions 30, 30' are connected. The error signal, now used for synchronization of the speed control of shaft 10, will remain small so that the other output of the particular resolver R1', etc., will still be the strength of the respective harmonic. The speed, or ω controlling servo Sc has an input from bus 30' and another input from the frequency command servo Ss, now in its Integrator Servo configuration, shown in the lower left corner, whose function is as follows further below.

As can be seen from FIG. 3a, the output voltages of each one of the buffer amplifiers BA, B'A', respectively, associated with the various main resolvers R1, R2 . . . Rn, are passed through corresponding phase-sensitive demodulators D1, D1', D2, D2', etc., and low-pass filters L1, L1', L2, L2', etc., respectively, and delivered in proper form to phase-sensitive modulators Mp1, Mp1', Mp2, Mp2', etc., shown within the respective converter units C1, C2, etc., and provided with a suitable reference voltage $V_c'$. The low-pass filters L1, L1', etc., are each provided with bandwidth control diagrammatically indicated at $f1, f2 \ldots fn$. As is intimated by the dotted line 50 all these bandwidth controls may conveniently be ganged together mechanically for operation in unison. For a search operation, the operator may select a certain filter bandwidth on all the converter servos.

The frequency command servo Ss comprises a manually operable potentiometer Po' connected between a potential —Vo and ground, and a mechanically operable potentiometer Po connected between a potential +Vo and ground. The slider of Po' can be connected to the servo loop of this servo through normally open contacts of switch 32 when the latter is moved to "ON" position in which case the motor M of this servo loop drives via shaft 11 and gear box 12 the slider of Po along the latter. This slider is conductively connected to a line 13 which leads, in one direction, to the third normally open contacts of switch 32, and, in the other direction, to the input of the speed control Sc to which also the synchronization bus 30' is connected.

While in FIG. 3a all push button switches 31 and 32 are shown in "OFF" position, it is clear that at any time only one of them can be in "ON" position. For starting the operation of the apparatus, the switch button 32 is pushed to "ON" position, while all converters C1, C2, etc., operate normally although this is of no interest at this moment. They are all disconnected from the bus 30 by the open switches 31.

If now the potentiometer Po' is operated moving the slider away from ground, the servo loop of Ss acts like a remote control device so as to move the slider of potentiometer Po to the same degree as Po' is operated. This detail of the arrangement is only provided for convenience but is not essential for the operation of the analyzer. As the potentiometer Po is adjusted the speed control Sc is caused to produce rotation of shaft 10 so that the speed ω proportionately increases.

Now the operator has to observe the indications of the various instruments P, F respectively. The phase angle indicators P will probably rotate slowly in one or the other direction and the amplitude indicators F will or will not show a certain value. In case the input signal $f(t)$ does contain a harmonic series, and when the reference frequency approaches the fundamental frequency of such a harmonic series, then the low frequency beat condition mentioned at the outset of this discussion will exist. When finally the particular harmonic series in $f(t)$ is found, this will show as the pointers in the phase angle indicators P come substantially to a standstill.

Then the operator may operate any one of the push button switches 31, preferably the switch of that converter C1, C2, etc., the indicator F of which shows the greatest amplitude, so that switch 32 moves to "OFF" position stopping further increase of ω, and that now the particular harmonic present in the respective converter is "locked on" and acts via bus 30, 30', as synchronizing signal whereby the analyzer is synchronized with the so far unknown signal $f(t)$. The existing harmonics and their relative amplitudes can now be identified from reading the indicators P, F. Furthermore, the integrator servo Ss will make slight adjustments in the value of the frequency or ω command signal present on 13 (derived from Po) in order to maintain the synchronizing signal on 30 and 30' at a low level. This is necessary due to the fact that long period variations in the frequency of the incoming signal $f(t)$ will cause large synchronization errors to appear on 30 and 30', thus throwing the system out of calibration.

Some details of a practical operation of this analyzer are as follows:

For use of this device, the signal $f(t)$ is first processed in a block 60 containing amplification, filtering, ACG, and output coupling to the modulator 61. An AGC (automatic gain control) signal can be derived by summing all harmonic strengths as shown in the lower part of the diagram via lines 62 and an amplifier AA. This signal can be read out as a "total signal strength" indication at T and would be the first indication of the presence of a rather weak harmonic sound. The purpose of AGC is conventional, namely, that of compressing the large dynamic signal range found in practice, except that care must be taken to insure that the AGC compressor is a low distortion type. Otherwise, distorting the incoming wave-shape would distort the resultant readouts, thus impairing the utility of the device.

Figure 4:
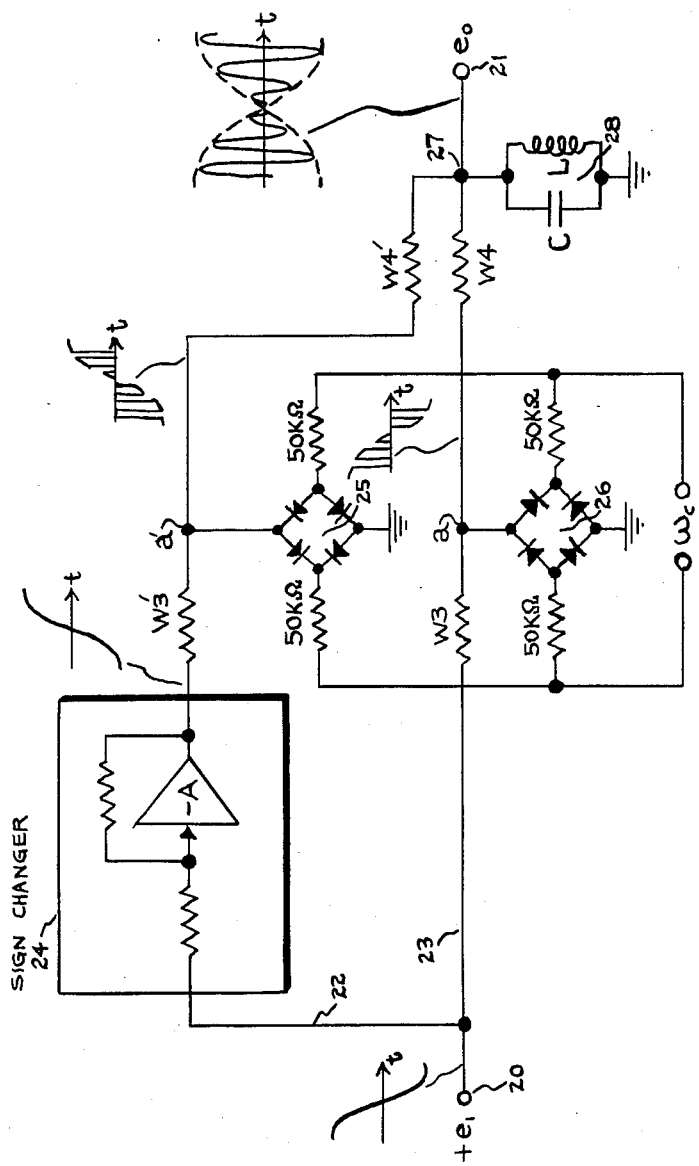
FIG. 4 is a schematic diagram illustrating details of a full-wave modulator forming a component of the apparatus illustrated by FIGS. 3a and 3b.

Referring now to FIG. 4 certain details of the full wave modulators 61, Mp1 are described. The modulator circuit of the Wien type as shown is one of several possibilities of modulators to be used. The circuit shows an input terminal 20 and an output terminal 21. Between the output and input terminals 20, 21 extend two branches 22 and 23. The branch 22 contains a sign changer device 24 which may be of the conventional type commercially known by the name Philbrick 7YPE(D.C.). In series with the sign changer 24 are connected a resistor $W_3$, and a second resistor $W_4'$. Connected to a junction point between the two last named resistors is a bridge type rectifier circuit 25 which in this particular case acts as an alternating switch between the branch 22 and ground with the effect of chopping the signal wave in synchronism with the carrier $\omega_c$ as shown. Similarly, in the branch 23 are connected in series a resistor $W_3$ and a second resistor $W_4$, and connected to a junction point between these two resistors is a bridge type rectifier circuit 26 which operates in the same manner as the circuit 25.

Finally, connected to the junction point 27 where the branches 22 and 23 are joined at the output end of the modulator, a band pass filter circuit 28 is connected, the other side of which is connected to ground.

Next to the input terminal 20 by way of example a simple sine wave $+e_1$ is shown diagrammatically. It can be seen that this wave after passing through the sign changer 24 appears as the wave $-e_1$ reversed in polarity, and that the not reversed wave $+e_1$ after passing through the point $a$ in the branch 23 is constituted of a square wave sequence of carrier waves with alternating polarities within the consecutive positive and negative waves of the modulation envelope. On the other hand a similar but sign-reversed wave appears in the branch 22 after passing the point $a'$ connected to the rectifier switch 25. Both wave forms are indicated in FIG. 4 diagrammatically. It will be understood, that the result obtained at the output terminal 21 is a full wave suppressed carrier modulated wave as also indicated in FIG. 4 and showing the modulation envelope.

In addition to the above mentioned AGC it is advisable to apply AGC individually to each converter servo (as indicated), since the loop stiffness, or gain, depends on the strength of the harmonic in question.

When selecting a harmonic for synchronization the AGC voltage of that harmonic may be transferred to the speed control servo loop as well as the error signal, to insure that synchronization be maintained even on weak signals. However this has not been shown on the diagram.

For use of the "Wave Analyzer" under certain conditions where not much noise is involved wider-band filtering is permissible as long as other beat frequencies remain sufficiently attenuated.

The exact number and particular harmonics of interest in a particular case obviously is a design variable. The basic resolver frequency generator-multiplier-filter configuration may be varied so as to produce correlation with a more specialized class of complex waveforms. For example, waveforms containing frequencies in the ratio of $m/n$ may be correlated by introducing certain similar values of gearing between resolvers as described in my above mentioned co-pending application. In fact, it appears that the technique described, in the use of the resolver as a correlator, has ramifications in low frequency detection and analysis as yet unknown to the art.

It will be understood that each of the elements described above, or two or more together, may also find a useful application in other types of methods and apparatus for analyzing wave signals differing from the types described above.

While the invention has been illustrated and described as embodied in a method and apparatus for analyzing low-frequency repetitive complex wave signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of analyzing low frequency repetitive complex wave signals of the form $f(t)$, comprising the steps of generating a number of reference frequencies constituting a harmonic series $\omega \ldots \omega n$ and impressing these reference frequencies individually on a constant carrier frequency $v_c$ for modulating the latter; resolving each of the resulting modulated forms of said carrier frequency into the respective sine and cosine terms of the particular reference frequency; simultaneously multiplying individually said sine and cosine terms by said complex wave signal for obtaining a corresponding number of pairs of correlation signals of the form $v_c f(t)$ sin $(n\omega t)$ and $v_c f(t)$ cos $(n\omega t)$, respectively, wherein $n$ is an integer varying between 1 and $n$; demodulating individually said correlation signals; low-pass filtering said individual demodulated correlation signals; and varying the fundamental frequency of said harmonic series of reference frequencies until zero beat condition between at least one repetitive frequency contained in said complex wave signal $f(t)$ and at least one of said pairs of correlation signals is established in which case every one of said reference frequencies contained in said harmonic series thereof which has been adjusted to said zero beat condition indicate the existence of an identical frequency in said complex wave signal $f(t)$.

2. A method of analyzing low frequency repetitive complex wave signals of the form $f(t)$, comprising the steps of generating a number of reference frequencies constituting a harmonic series $\omega \ldots \omega n$ and impressing these reference frequencies individually on a constant carrier frequency $v_c$ for modulating the latter; resolving each of the resulting modulated forms of said carrier frequency into the respective sine and cosine terms of the particular reference frequency; simultaneously multiplying individually said sine and cosine terms by said complex wave signal for obtaining a corresponding number of pairs of correlation signals of the form $v_c f(t)$ sin $(n\omega t)$ and $v_c f(t)$ cos $(n\omega t)$, respectively, wherein $n$ is an integer varying between 1 and $n$; demodulating individually said correlation signals; low-pass filtering said individual demodulated correlation signals; varying the fundamental frequency of said harmonic series of reference frequencies until zero beat condition between at least one repetitive frequency contained in said complex wave signal $f(t)$ and at least one of said pairs of correlation signals is established in which case every one of said reference frequencies contained in said harmonic series thereof which has been adjusted to said zero beat condition indicates the existence of an identical frequency in said complex wave signal $f(t)$; and synchronizing said fundamental frequency of said harmonic series of reference frequencies by means of one of said correlation signals when a substantially zero beat condition is established so that this condition is automatically maintained further on.

3. An apparatus for analyzing low-frequency repetitive complex wave signals, comprising, in combination, first input means for a constant carrier frequency voltage $v_c$; second input means for a low-frequency complex wave signal $f(t)$; modulator means connected with said first and second input means for modulating said carrier frequency by said complex wave signal; a plurality of $n$ resolver means operatively connected in series with each other and with the output of said modulator means and being capable of resolving an input voltage into corresponding sine and cosine terms thereof; means for introducing into each of said resolver means a variable modulation frequency $m\omega$ as a reference frequency, $m$ being an integer varying between 1 for the first of said resolver means and $n$ for the last of said series of $n$ resolver means, so that said respective modulation frequencies constitute a harmonic series, the individual pairs of output signals of said resolver means having the form $v_c f(t)$ sin $(m\omega t)$ and $v_c f(t)$ cos $(m\omega t)$; means for uniformly varying said harmonic modulation frequencies $m\omega$; demodulator means respectively connected to the outputs of each of said resolver means; low-pass filter means for individually filtering said output signals of said resolver means after their demodulation; synchronizing means for synchronizing said modulation frequencies $m\omega$ with a selected harmonic series component of said complex wave signal and output means respectively connected with said individual filter means associated with each respective one of said resolver means, and including indicator means for indicating a beat condition between said complex wave signal and any one of said reference modulation frequencies, whereby if during variation of said modulation frequencies zero beat condition is indicated by any one of said indicator means, the existence, in said complex wave signal, of a frequency identical with that modulation frequency $m\omega$ for which zero beat condition has been obtained, is established.

4. An apparatus for analyzing low-frequency repetitive complex wave signals, comprising, in combination, first input means for a constant carrier frequency voltage $v_c$; second input means for a low-frequency complex wave signal $f(t)$; modulator means connected with said first and second input means for modulating said carrier frequency by said complex wave signal; a plurality of $n$ resolver means operatively connected in series with each other and with the output of said modulator means and being capable of resolving an input voltage into corresponding sine and cosine terms thereof; means for introducing into each of said resolver means a variable modulation frequency $m\omega$ as a reference frequency, $m$ being an integer varying between 1 for the first of said resolver means and $n$ for the last of said series of $n$ resolver means, so that said respective modulation frequencies constitute a harmonic series, the individual pairs of output signals of said resolver means having the form $v_cf(t)$ sin $(m\omega t)$ and $v_cf(t)$ cos $(m\omega t)$; means for uniformly varying said harmonic modulation frequencies $m\omega$; demodulator means respectively connected to the outputs of each of said resolver means; low-pass filter means for individually filtering said output signals of said resolver means after their demodulation; and output means respectively connected with said individual filter means associated with each respective one of said resolver means, and including rectangular-to-polar coordinate converter means for producing from each of said pairs of output signals a relative phase angle indication characteristic of the particular harmonic series component contained in the respective pair of said output signals, and for producing an amplitude indication of said particular harmonic series component, said output means further including indicator means for indicating said amplitude relative to the amplitude indications in the other output means, and for indicating in the form of phase angle a beat condition between said complex wave signal and any one of said reference modulation frequencies, whereby if during variation of said modulation frequencies zero beat condition is indicated by any one of said indicator means, the existence, in said complex wave signal, of a frequency identical with that modulation frequency $m\omega$ for which zero beat condition has been obtained, is established.

5. An apparatus as claimed in claim 4, wherein said plurality of resolver means are of the rotor-type and comprise common shaft means for synchronously rotating all the rotors of all of said resolver means, and including speed control means for rotating said shaft means at a speed determining said modulation frequency $m\omega$.

6. An apparatus as claimed in claim 5, including voltage control means for varying an input voltage applied to said speed control means.

7. An apparatus as claimed in claim 6, including integrator servo means operatively connected between said speed control means and said converter means, said converter means including means for deriving from the respective pair of said output signals appearing therein an error signal and for applying such error signal to said integrator servo means in such a manner that, by the interaction between said integrator servo means and said speed control means, said speed of said shaft means is automatically synchronized with the harmonic series component appearing in the particular converter means.

8. An apparatus as claimed in claim 7, wherein said integrator servo means includes second voltage control means for operating said integrator servo means as a frequency command means, and change-over switch means alternatively movable between a position in which said integrator servo means is connected with said second voltage control means and is disconnected from said converter means so that it acts as frequency command means, and a second position in which it is connected with said converter means and disconnected from said second voltage control means so that it acts only as integrator servo means.

9. An apparatus as claimed in claim 8, including a synchronization bus line connected at one end to said change-over switch means, and wherein each of said converter means includes a two-pole change-over switch means alternatively movable between a first position in which the particular converter means is connected to said bus line for applying said error signal to said integrator servo means, while said indicator means are rendered inoperative, and a second position in which the particular converter means is disconnected from said bus line while said indicator means are rendered operative.

10. An apparatus as claimed in claim 9, wherein said change-over switch means of said integrator servo means and all of said two-pole change-over switches of all of said converter means are ganged together mechanically in such a manner that whenever any one of said change-over switch means is in its first position all the other ones are in their second position, and vice versa.

11. An apparatus as claimed in claim 10, wherein said low-pass filter means are provided with means for controlling the band width thereof, all of said individual low-pass filter means being ganged together for being operated conjointly.

12. An apparatus as claimed in claim 11, including summing amplifier means connected at its input with all of said converter means for summing up and amplifying said amplitude indications of said respective converter means, and amplifier, noise filter and automatic gain control means connected in said second input means and controlled by the output of said summing amplifier means for compressing a large dynamic signal range of the complex wave signal $f(t)$.

References Cited in the file of this patent

UNITED STATES PATENTS

| | | |
|---|---|---|
| 2,481,659 | Guanella | Sept. 13, 1949 |
| 2,522,369 | Guanella | Sept. 12, 1950 |
| 2,661,458 | Saraga | Dec. 1, 1953 |
| 2,752,092 | McDonal | June 26, 1956 |
| 2,753,524 | Newson | July 3, 1956 |
| 2,950,435 | Locher et al. | Aug. 23, 1960 |

OTHER REFERENCES

Electronics, May 1, 1959, pages 56–57.

UNITED STATES PATENT OFFICE

CERTIFICATE OF CORRECTION

Patent No. 3,045,180                              July 17, 1962

Morton Losher

It is hereby certified that error appears in the above numbered patent requiring correction and that the said Letters Patent should read as corrected below.

In the heading to the printed specification, lines 3 and 4, for "Morton Losher, 700 Fort Washington Ave., Bergenfield, N. J." read -- Morton Losher, Bergenfield, N. J. (700 Fort Washington Ave., New York, N. Y.) --.

Signed and sealed this 11th day of December 1962.

(SEAL)
Attest:

ERNEST W. SWIDER
Attesting Officer

DAVID L. LADD
Commissioner of Patents